Feb. 16, 1937. E. L. WIEGAND Re. 20,272
ELECTRIC RESISTANCE HEATING ELEMENT
Original Filed Jan. 8, 1932
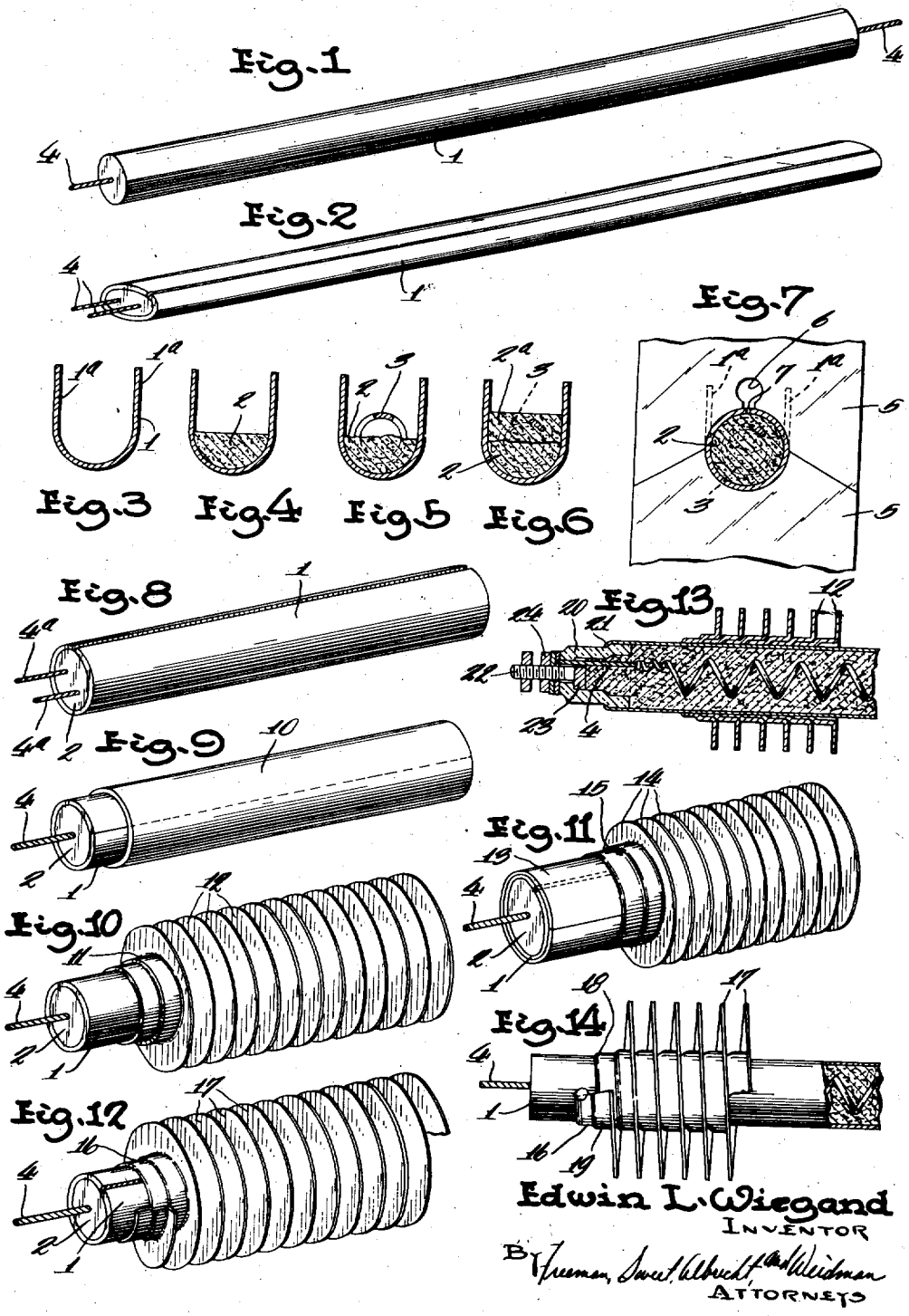
Edwin L. Wiegand
INVENTOR
By Freeman, Sweet, Albrecht & Weidman
ATTORNEYS Reissued Feb. 16, 1937 Re. 20,272

UNITED STATES PATENT OFFICE 20,272

ELECTRIC RESISTANCE HEATING ELEMENT

Edwin L. Wiegand, Pittsburgh, Pa.

Original No. 1,997,844, dated April 16, 1935, Serial No. 585,491, January 8, 1932. Application for reissue February 26, 1936, Serial No. 65,928

18 Claims. (Cl. 201—67)

This invention relates to electric resistance heating and has for its object the provision of a new, improved, and simplified construction of heating element and a new and improved mode of making the same.

In the drawing accompanying and forming a part of this application Figs. 1 and 2 are perspective views of alternative forms of my improved heating element; Figs. 3 to 7 inclusive are enlarged detail views illustrating successive steps in the process of manufacturing said elements; Fig. 8 illustrates a modified form of device; Fig. 9 is a perspective view of one of said elements provided with a plain sheath; Figs. 10 and 11 illustrate my improved elements as provided with fins applied to the naked sheathing; Fig. 12 is a perspective view of one of my units provided with the fins applied to the encased sheathing; and Figs. 13 and 14 are detail views illustrating two modes of applying the fins to the sheath so as to produce a convenient coverage therefor.

My improved and simplified heating element comprises essentially of a metal sheath closely surrounding a mass of electrically insulating, heat-conducting, compactible material in which is buried an electric resistance heating wire, the sheath being folded or rolled around the insulating material as a part of the process of making the element, the result being that one characteristic of my invention is a sheath which has a seam along one side from end to end, the seam being not necessarily closed, but may be of the character of a slit or slot. 1 denotes the sheath, 2 the electrically non-conducting material and 3 the resistance wire.

In the construction of my improved electric resistance heating unit I may use an elongated strip of sheet-metal, having a width equal to the circumference of the desired sheath and a length equal to the length of the desired sheath, the strip being first drawn to the form of an open channel as shown for example in Fig. 3, after which the resistor and the insulating material are introduced and the channel closed laterally to compact the latter about the former. One method is to cover the bottom of the channel with a quantity of the insulating material 2 which is preferably a cementitious substance applied in a moist condition. A suitable substance, though it may be granular in character, desirably has, in one state, mechanical characteristics of impressionability and fluency, as of a plastic. While I do not limit myself to the composition of this material I recommend such substances as alumina, magnesia, and zirconia, combined with a smaller amount of silica and preferably also containing a very small amount of ball-clay or similar material to constitute a binder. In this material I immerse the electric resistance wire 3, here shown as pre-shaped into sinuous or helical form, with its ends twisted about terminals 4 made of wire of a higher electrical conductivity, after which a second quantity of similar cementitious material is introduced as shown at 2ª in Fig. 6, after which the device is placed between suitable dies 5—5 and the lips 1ª of the channel are closed from the dotted line position shown in Fig. 7 to the form of a closed tube or sheath. I have shown the dies as formed with a groove or channel 6 communicating with the seam 7 for the reception of any excess insulating material which may be forced out of the sheath in this operation.

The formed element is now dried and baked at a sufficient temperature to dehydrate the insulating material to a sufficient degree to prevent the occurrence of electrolytic action when operated electrically.

In Fig. 1 the terminal wires 4—4 project at opposite ends; in Figs. 2 and 8 both project from the same end. Any suitable form of terminal block may be employed, a preferred arrangement being that shown in Fig. 13 wherein an insulating bushing 20 is introduced into the end of the sheath and secured by upsetting or rolling the end of the sheath thereover as shown at 21. Located in this bushing is an externally threaded binding post 22, having a head 23 inside the bushing, the head and bushing being notched for the passage of the wire 4 which is then wrapped about the post beneath the nut 24.

Any suitable or desired cross-section of the sheath can be adopted; in Fig. 1 I have shown a sheath of circular cross-section, in Fig. 2 one of elliptical cross-section, and many others may be used. Also different arrangements of wire and terminals are possible, either for example by locating one terminal 4 at each end of the rod as shown in Fig. 1, or by locating two terminals at the same end as shown at 4ª in Fig. 8. It is not necessary to bring the margins of the two lips of the sheath into butt contact with each other. However, a slight spacing at junction of the lips is advantageous in facilitating the dehydration of the insulating material, although such proximity is desirably secured as will insure adequate mechanical strength.

Due to the construction hereinbefore described a high degree of uniformity of location and compression of the insulating material is obtained, also quick and thorough dehydration is secured, but it is desirable to shield the device against the reabsorption of moisture and also in some cases to provide an extension of heat dissipating area; this can be done in any one of many ways. The simplest mode is to insert the completed element into an outer, plain, liquid-tight tube 10 as shown in Fig. 9; a second plan is to introduce the element into a tubular shell 11 provided externally with external flanges 12 as shown in Fig. 10. A third scheme is to surround the element, either with or without an intervening shell element 13, with fins as shown in Fig. 11, each fin comprising a laterally extending portion 14 and an integral tubular portion 15 of tapered or graduated diameter so as to fit partly on the sheath or shell and partly upon the tubular portion 15 of the next succeeding fin. Another plan is to wind upon the exterior of the element a strip 16 as shown in Figs. 12 and 14, one edge of this strip having an outturned fin portion 17 and the opposite margin 18 abutting or underlying a radially offset or flared portion 19 of the adjacent convolution of the strip.

The essential mode of construction heretofore described enables this resistance-element to be made of long, narrow, shape without sacrificing the uniformity of distribution and pressure of the insulating-material, and this in turn enables the production of an element having a high degree of heat-dissipating ability, due to the short heat-path between the resistance-wire and the sheath and to the close contact between this wire and the heat-conducting material in which it is submerged. The ease of transmission of heat from the resistance-wire to the sheath renders the employment of fins specially important in order to secure sufficiently rapid dissipation of this heat, and renders particularly important some mode of applying the fins, such as one of the modes shown in Figs. 11, 12, 13, and 14 thereof, wherein firm metal-to-metal heat-conducting contact between the parts is secured with certainty.

From the foregoing it will be apparent to those skilled in the art that the illustrated embodiments of my invention provide new and improved electrical resistance heating elements and new and improved methods of making the same and accordingly, each accomplishes the principal object of my invention. On the other hand, it also will be obvious to those skilled in the art that the illustrated embodiments of my invention may be variously changed and modified, or features thereof, singly or collectively, embodied in other combinations than those illustrated, without departing from the spirit of my invention, or sacrificing all of the advantages thereof, and that accordingly, the disclosure herein is illustrative only, and my invention is not limited thereto.

For the sake of brevity, I have referred, in certain of the appended claims, to an insulating material having characteristics rendering it suitable in the practice of my invention, as plastoid.

I claim:

1. The method of producing electrical resistance heating elements which includes the steps of forming a metal strip into a U-shaped channel the lower part of which is substantially semi-cylindrical in cross section, filling said semi-cylindrical portion with fluent refractory insulating material, partially embedding a heating element in said insulating material, adding a further quantity of said insulating material and then by single operation bending said strip above said semi-cylindrical portion into semi-cylindrical shape and compressing said insulating material and causing it to conform to and fill the interior of the sheath into which said strip is thus formed.

2. The method of producing an electrical resistance heating element which includes the steps of bending an elongated metal strip into the form of an open channel, then introducing a mass of fluent refractory, insulating material into said channel and embedding a preformed resistor therein, then bending said channel into the form of a tube having a longitudinally extending slot therein and then applying to the exterior of said tube a metallic shell having a relatively large heat dissipating area and which closes said slot.

3. The method of producing an electrical resistance heating element which includes the steps of bending an elongated metal strip into the form of an open channel, then introducing a mass of fluent refractory, insulating material into said channel and embedding a preformed resistor therein, then bending said channel into the form of a tube having a longitudinally extending slot therein and then winding spirally about said tube a metal strip which is L-shaped in section and which completely encloses said tube and has extended contact therewith.

4. The method of producing an electrical resistance heating element, comprising: forming a metal strip into the shape of an open channel; introducing a mass of plastoid insulating material into said channel; embedding a resistor in said insulating material; and bending said channel to form a sheath surrounding said insulating material, the formation of said sheath compacting said insulating material about said resistor.

5. The method of producing an electrical resistance heating element, comprising: forming a metal strip into the shape of an open channel; introducing a mass of plastoid insulating material into said channel; embedding a resistor in said insulating material; bending said channel to form a sheath surrounding said insulating material; and applying metallic sheathing means to the exterior of said sheath.

6. The method of producing an electrical resistance heating element, comprising: forming a metal strip into the shape of an open channel; introducing a mass of plastoid insulating material into said channel; embedding a resistor in said insulating material; bending said channel to form a sheath surrounding said insulating material; and applying metallic sheathing means to the exterior of said sheath; said metallic sheathing means including at least one metallic member of continuous transverse cross-section.

7. The method of producing an electrical resistance heating element, comprising: forming a metal strip into the shape of an open channel; introducing a mass of plastoid insulating material into said channel; embedding a resistor in said insulating material; bending said channel to form a sheath surrounding said insulating material; and winding spirally about said sheath a metal strip.

8. The method of producing an electrical resistance heating element, comprising: forming a metal strip into the shape of an open channel; introducing a mass of plastoid insulating material into said channel; embedding a resistor in said insulating material; bending said channel to form a sheath surrounding said insulating material; and applying metallic sheathing means to the exterior of said sheath; said sheathing means having at least one transversely extending flange.

9. The method of producing an electrical resistance heating element, comprising: forming a metal strip into the shape of an open channel; introducing a mass of plastoid insulating material into said channel; embedding a resistor in said insulating material; bending said channel to form a sheath surrounding said insulating material; and applying metallic sheathing means to the exterior of said sheath; said sheathing means including at least one metallic member, of continuous circumferential cross-section, having a transversely extending flange.

10. The method of producing an electrical resistance heating element, comprising: forming a metal strip into the shape of an open channel; introducing a mass of plastoid insulating material into said channel; embedding a resistor in said insulating material; bending said channel to form a sheath surrounding said insulating material; and winding spirally about said sheath a metal strip having a transversely extending flange.

11. The method of producing an electrical resistance heating element, comprising: embedding a resistor in plastoid insulating material in an open channel preformed from a metal strip; applying forces to said channel to form a sheath about said insulating material; and forcing said sheath to compact said insulating material about said resistor within said sheath.

12. The method of producing an electrical resistance heating element, comprising: embedding a resistor in compactible granular refractory insulating material in an open channel preformed from a metal strip; applying forces to said channel to form a sheath about said insulating material; and forcing said sheath to compact said insulating material about said resistor within said sheath.

13. The method of producing an electrical resistance heating element, comprising: introducing a mass of plastoid insulating material into an open channel preformed from a metal strip; inserting a resistor in said insulating material; introducing a further mass of plastoid insulating material into said channel, over said first named mass and over said resistor; applying forces to said channel to form a sheath about said insulating material; and forcing said sheath to compact said insulating material about said resistor within said sheath.

14. The method of producing an electrical resistance heating element, comprising: introducing a mass of compactible granular refractory insulating material into an open channel preformed from a metal strip; inserting a resistor in said insulating material; introducing a further mass of compactible granular refractory insulating material into said channel, over said first named mass and over said resistor; applying forces to said channel to form a sheath about said insulating material; and forcing said sheath to compact said insulating material about said resistor within said sheath.

15. The method of producing an electrical resistance heating element, comprising: introducing a mass of plastoid insulating material into an open channel preformed from a metal strip; embedding a resistor in said insulating material; applying forces to said channel to form it into a sheath substantially circumferentially closed about said insulating material; and forcing said sheath to compact said insulating material about said resistor within said sheath.

16. The method of producing an electrical resistance heating element, comprising: introducing a mass of compactible granular refractory insulating material into an open channel preformed from a metal strip; embedding a resistor in said insulating material; applying forces to said channel to form it into a sheath substantially circumferentially closed about said insulating material; and forcing said sheath to compact said insulating material about said resistor within said sheath.

17. The method of producing an electrical resistance heating element, comprising: introducing a mass of plastoid insulating material into an open channel preformed from a metal strip; inserting a resistor in said insulating material; introducing a further mass of plastoid insulating material into said channel, over said first named mass and over said resistor; applying forces to said channel to form it into a sheath substantially closed circumferentially about said insulating material; and forcing said sheath to compact said insulating material about said resistor within said sheath.

18. The method of producing an electrical resistance heating element, comprising: introducing a mass of compactible granular refractory insulating material into an open channel preformed from a metal strip; inserting a resistor in said insulating material; introducing a further mass of compactible granular refractory insulating material into said channel, over said first named mass and over said resistor; applying forces to said channel to form it into a sheath substantially closed circumferentially about said insulating material; and forcing said sheath to compact said insulating material about said resistor within said sheath.

EDWIN L. WIEGAND.